US012521851B2

(12) United States Patent
Locatelli

(10) Patent No.: US 12,521,851 B2
(45) Date of Patent: Jan. 13, 2026

(54) CLAMPING TOOL WITH TIGHTENING TORQUE CONTROL

(71) Applicant: ATLAS COPCO INDUSTRIAL TECHNIQUE AB, Stockholm (SE)

(72) Inventor: Andrea Locatelli, Verderio (IT)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 170 days.

(21) Appl. No.: 17/778,112

(22) PCT Filed: Dec. 17, 2020

(86) PCT No.: PCT/IB2020/062095
§ 371 (c)(1),
(2) Date: May 19, 2022

(87) PCT Pub. No.: WO2021/124187
PCT Pub. Date: Jun. 24, 2021

(65) Prior Publication Data

US 2022/0347822 A1 Nov. 3, 2022

(30) Foreign Application Priority Data

Dec. 19, 2019 (IT) ........................ 102019000024730

(51) Int. Cl.
*B25B 23/142* (2006.01)
*B25B 23/00* (2006.01)

(52) U.S. Cl.
CPC ...... *B25B 23/1425* (2013.01); *B25B 23/0035* (2013.01)

(58) Field of Classification Search
CPC ... B25B 23/00; B25B 23/0035; B25B 23/142; B25B 23/1422; B25B 23/1425; B25B 23/14; B25B 23/147
See application file for complete search history.

(56) References Cited

U.S. PATENT DOCUMENTS 4,522,075 A 6/1985 Pohl
4,976,133 A * 12/1990 Pohl ...................... G01L 25/003 73/862.08

(Continued)

FOREIGN PATENT DOCUMENTS

DE 31 39 374 A1 4/1983
EP 0 100 023 A2 2/1984

(Continued)

OTHER PUBLICATIONS

International Search Report issued Feb. 16, 2021 in PCT/IB2020/062095 filed on Dec. 17, 2020, 4 pages.

(Continued)

*Primary Examiner* — Robert J Scruggs
(74) *Attorney, Agent, or Firm* — Oblon, McClelland, Maier & Neustadt, L.L.P.

(57) ABSTRACT

A clamping tool with tightening torque control includes a body containing control circuits and an electronic processing unit having at one end a handle for the grip of an operator who performs the tightening, and at the other end an arm. The arm at its free end includes a seat into which a plurality of inserts can alternatively be inserted, suitable for engaging the tool with a corresponding type and/or size of a mechanical member on which the tool is intended to act to perform a tightening operation. On the arm there is a sensor adapted to detect the tightening torque exerted on the mechanical member.

3 Claims, 2 Drawing Sheets

(56) References Cited

U.S. PATENT DOCUMENTS

| | | | | |
|---|---|---|---|---|
| 4,982,612 | A * | 1/1991 | Rittmann | G01L 1/225<br>73/862.26 |
| 11,453,105 | B2 * | 9/2022 | Silha | B25B 23/147 |
| 2010/0206141 | A1 | 8/2010 | Nakata et al. | |

FOREIGN PATENT DOCUMENTS

| | | | | |
|---|---|---|---|---|
| EP | 0 362 696 | A1 | 4/1990 | |
| EP | 0 372 247 | A2 | 6/1990 | |
| EP | 1 022 097 | A2 | 7/2000 | |
| EP | 2 168 726 | A1 | 3/2010 | |
| EP | 2326464 | A1 * | 6/2011 | B25B 23/0035 |
| EP | 2 712 709 | A1 | 4/2014 | |
| FR | 2 841 650 | A1 | 1/2004 | |

OTHER PUBLICATIONS

International Preliminary Report on Patentability issued Mar. 21, 2020 in PCT/IB2020/062095 filed on Dec. 17, 2020, 9 pages.

* cited by examiner

CLAMPING TOOL WITH TIGHTENING TORQUE CONTROL

The present invention relates to an electronic tool for the controlled clamping of mechanical members such as, for example, a dynamometric key in which it is possible to control the tightening torque exerted on the bolt to be clamped.

Clamping tools are known in the state of the art that comprise a body, containing the various control members and, possibly, activation members, to which one of various removable inserts is coupled, each of which is intended to engage a corresponding type of mechanical member (e.g. the head of a screw, with male or female coupling) on which the tool is intended to act.

Electronic tools of this type comprise sensors, including a torque sensor, for detecting the torque exerted on the mechanical member and other sizes of interest, in order to enable controlled clamping of the mechanical member through appropriate processing means that show the operator various parameters of interest and, if appropriate, control the performance of the clamping operation.

Patent EP2326464 describes a tool of this type in the form of a dynamometric key, which comprises a body, containing the control circuits and processing unit of the key, on one side a handle (advantageously containing rechargeable power supply batteries for the key) and on the other side an arm. On the body there is advantageously a display for showing information and operating data and a keyboard that enables data and controls to be entered. In a relevant seat placed at the end of the arm, a tool head is inserted interchangeably which is to be coupled with the type of mechanical member (e.g. the head of a screw, with male or female coupling) on which the key is intended to act.

The sensors that measure the torque to be exerted on the member to be clamped are placed on the arm and comprise at least one strain gauge, which is a sensor whose electric resistance varies with the deformation that it undergoes itself; therefore, it converts force, pressure, tension, weight, etc. into an electrical resistance that can be measured.

Currently, to perform torque measurements on dynamometric keys with electronic reading, four strain gauge grids are mounted onto the mechanical cell connected in a Wheatstone bridge configuration, as indicated in FIGS. 2 and 3.

The two strain gauge grids that perform the first half bridge are positioned at a first distance D1 from the end of the arm and the other two that perform the second half bridge are positioned at a second distance D2 from the end of the arm.

With respect to the axis Y of the rotation that is exerted onto the key during the tightening, the two half bridges are therefore distanced by D1+Lc and D2+Lc, respectively, where Lc represents the "diameter" of the tool head as illustrated in FIGS. 4 and 5.

With such diagram having exact information available on the position along the arm of the key of the two half bridges and of the fulcrum of the lever on the handle and through the two measured deformations $\varepsilon_1$ and $\varepsilon_2$ of the strain gauges, it is possible to calculate the torque exerted on the joint to be tightened also knowing the value Lc ("diameter" of the tool head).

Such measurement system is not very effective as the precision of the measurements depends on the exact knowledge of the position of the strain gauges along the arm. Furthermore, the operator must grip the key ensuring that the fulcrum tip on the handle F is the one pre-set in the key memory. Any changes to the measurement Lc, e.g. due to the use of extensions or similar elements that are interposed between the tool head and the arm, invalidate the measurement and their presence and dimensions are entered into the key memory for performing a corrective calculation of the torque measured by the strain gauges in Wheatstone bridge configuration.

Finally, the different position of the two half bridges with respect to the fulcrum determines a different strain that the strain gauges thereof receive. In the configuration of FIG. 1 it was verified that the first half bridge, the one at distance D1, is overstrained. To compensate for that, the arm is made with a first narrower portion (a1 in FIG. 5) and a second wider one (a2 in FIG. 5).

The object of the present invention is that of overcoming the aforesaid drawbacks by proposing a clamping tool with control of the tightening torque having the characteristics of claim 1.

Further characteristics and advantages of the present invention will become clear from the following description and appended figures, provided purely by way of non-limiting example, in which.

Figure 1:
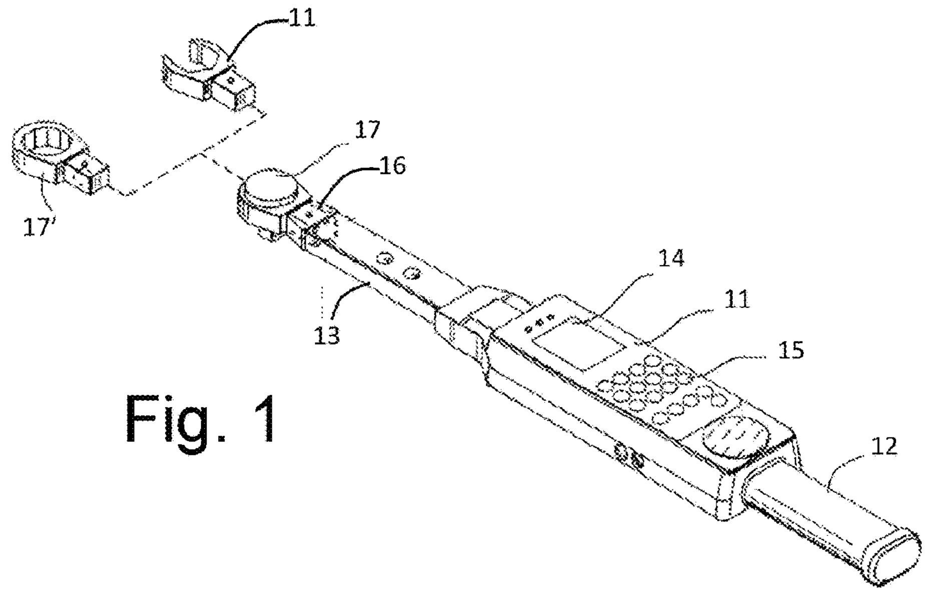
FIG. 1 is a perspective view of the clamping tool according to the present invention.
Figure 2:
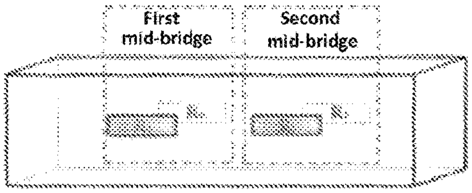
Fig. 2 Prior Art
FIGS. 2 and 3 are schematic views of a strain gauge sensor present in tools of the prior art.
Figure 3:
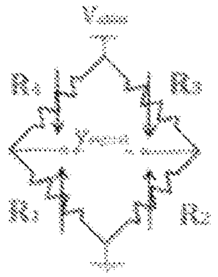
Fig. 3 Prior Art
Figure 4:
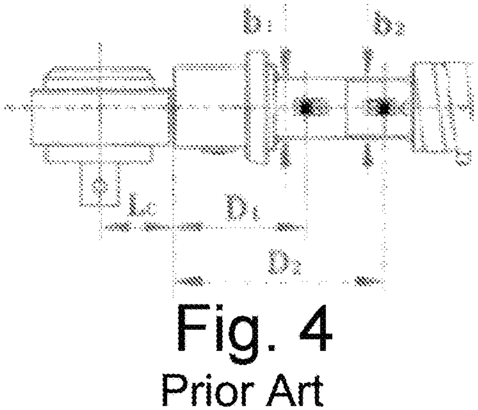
Fig. 4 Prior Art
FIGS. 4 and 5 are schematic views of the portion of a clamping tool in which the sensors according to the prior art are positioned.
Figure 5:
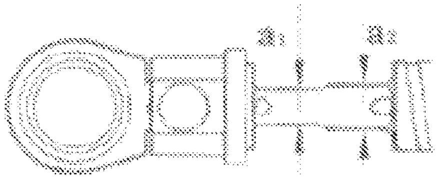
Fig. 5 Prior Art
Figure 6:
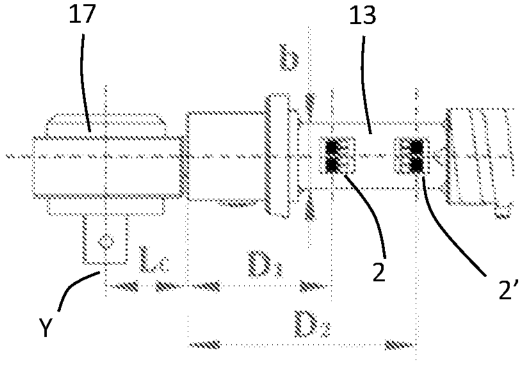
FIGS. 6 and 7 are schematic views of a strain gauge sensor according to the present invention.
Figure 7:
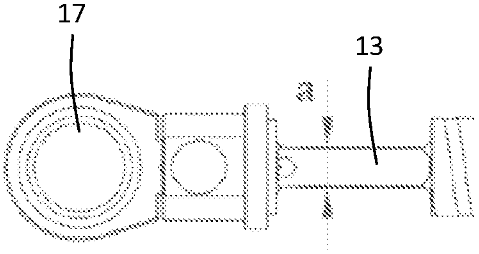
Figure 8:
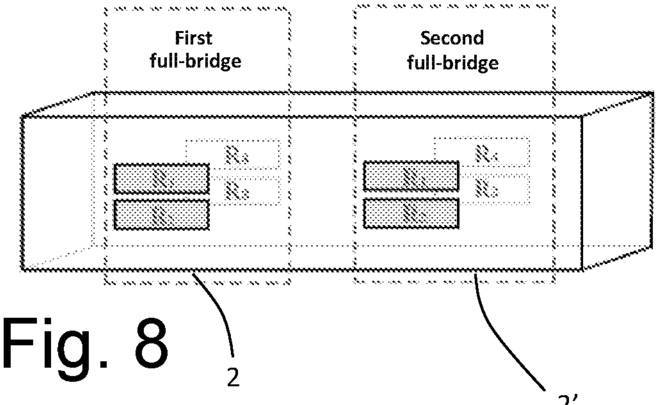
FIGS. 8 and 9 are schematic views of the portion of a clamping tool in which the sensors according to the present invention are positioned.
Figure 9:
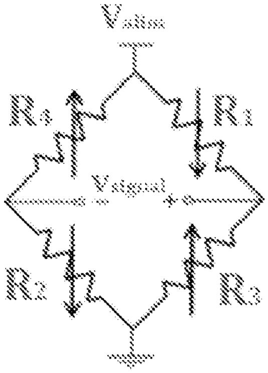

With reference to the appended figures, the clamping tool according to the present invention comprises a body 11, containing the control circuits and an electronic processing unit having at one side a handle 12 (preferably containing rechargeable power supply batteries of the key) and on the other side an arm 13. On the body 11 there is advantageously a display 14 for showing information and operating data and a relevant keyboard 15 enables data and controls to be entered.

Naturally, it is understood that in the event that the processing or storage of data requires a unit that is not easily or completely containable in the body 11, the body 11 can be connected, by a cable or a wireless connection, to an external processing unit. A cabled connection can also be provided for supplying external power.

In an appropriate seat 16 at the end of the arm 13 a plurality of inserts 17, 17', 17" can alternatively be inserted. For example, each insert will be adapted to engage the key with a corresponding type and/or size of mechanical member or element (screw, nut, etc.) onto which the tool is intended to act.

Although for simplicity purposes, inserts all of a similar size are shown, elongated inserts or with arms that have a particular shape may also be provided, as is known in the field.

Each insert may comprise a transponder inside in a suitable position (typically in the engagement shank to the seat 16) for coupling to an appropriate antenna proximal to the seat 16 itself when mounted on the tool.

The coupling method between the transponder and the antenna for activating the transponder (usually known as "tag") and the communication are widely known and will therefore not be described in detail.

The tool comprises a sensor means (e.g. made with strain gauges arranged in the arm 13) for detecting the torque exerted on the mechanical member. Advantageously, a sensor may be provided (e.g. a gyroscope) for detecting the tightening angle.

According to an aspect of the present invention, the sensor means of the tool comprises a first torque sensor 2 and a second torque sensor 2' arranged respectively along the longitudinal axis X of the arm in a position M1 of the arm 13 at a distance D1 from the end of the arm itself and the second one in a position M2 of the arm 13 at a distance D2 from the end of the arm itself. Such sensors are able to measure the torque exerted in such points M1 and M2; M1 and M2 also correspond to the two bending moments in such points.

Through the double measurement (in two points) along the arm, which is transmitted to the tool processing unit, it is possible for such unit to precisely calculate the torque exerted on the point M of which we wish to measure the bending moment, which identifies the axis of rotation of the mechanical member to be tightened and the point of application of the tightening torque; such point M being placed at a known distance Lc from the end of the arm.

Such distance may be advantageously established through the use of an insert provided with a transponder from which the type of insert (17) used is automatically detected, so that the distance Lc is automatically obtained from the control unit.

Each sensor comprises a Wheatstone bridge having four strain gauge grids that form the sensitive element. Preferably, the arm is tube shaped and each bridge has two strain gauge grids mounted on the traction side, and two on the opposite compression side on cells having a rectangular or square section.

Figure 10:
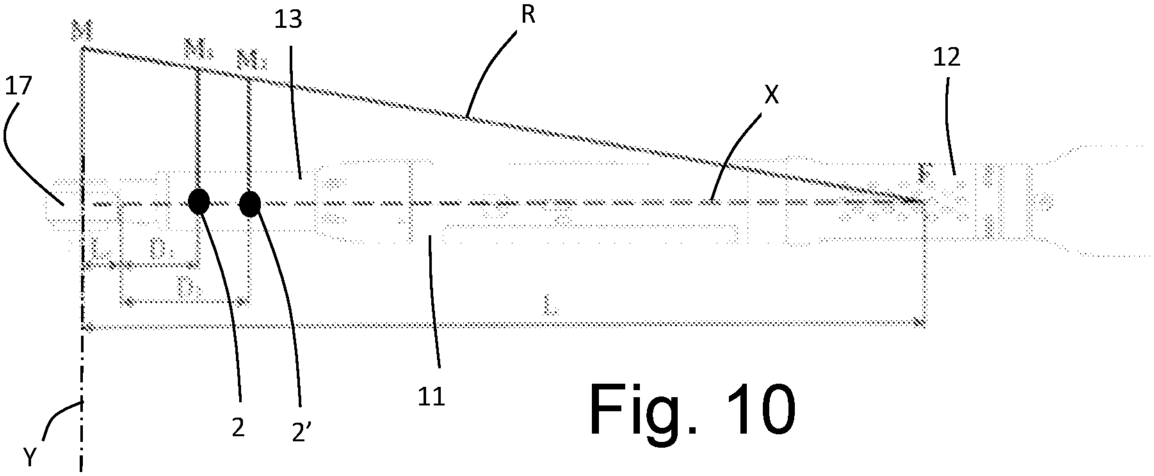
FIG. 10 illustrates the clamping tool to which a force F is applied on the handle of the key.

As illustrated in FIG. 10, the operator applies a force on the handle of the key in the transverse direction at a distance L from the joint to be tightened, generating a bending moment along the longitudinal axis of the key that increases linearly (distributed along a straight line R).

The two sensors identify two measurements in points M1 and M2 which are sufficient for obtaining the information related to the slope of the straight line R. Therefore, by knowing the position of the point of application M with respect to the position M1 and M2 of the sensors, the exerted torque can be calculated by measuring the voltages V1 and V2 of the two Wheatstone bridges.

Such measurement is not affected by the position F of the operator's hand on the handle as takes place in the prior art. In fact, the slope of the straight line R is simply obtained by knowing the measurements of the two sensors and their position M1 and M2.

The measurement of the torque on the joint is independent from the point of application of the force on the handle of the key. For example, it is possible to add an extension to the end of the key to provide the same torque with a lower force.

Advantageously, it is possible to perform a calibration step on the tool from which to start from known values of:

M=Moment applied through the balance,

L=the arm,

Lc=Distance connected with the insert used,

D1 and D2=Distance of the strain gauge bridges.

By applying a torque through a balance the deformations on the individual bridges are read, wherein the bending moments M1 and M2 can also be calculated theoretically. At this point there will be a single equation with two unknowns. By making a second measurement, the value of the coefficients that enable the correct torque value to be calculated can be obtained.

In fact, by knowing the torque exerted on the point M and the position F, the angular coefficient of the line R is determined. Then, from the measurements of the sensors 2 and 2', by interpolating with the straight line R, the positions M1 and M2 of the sensors to be memorized on the tool processing unit for subsequent uses are determined.

Furthermore, the use of a double sensor makes it possible to exploit a high sensitivity value (2÷3 mV) in the measurement of M1 and M2. By using two complete Wheatstone bridges (with four sensitive elements each) there is a rather large electrical signal available in order to increase the precision on the individual measurement.

It is possible to calculate the torque applied to the centre of the joint also by using a ratchet of different dimensions as long as the latter are known (Lc); therefore, it is possible to use an extension inserted between the ratchet and the end of the transducer, so as to be able to apply a greater torque at the ratchet, without risking damaging the strain gauges.

Possible positioning errors of the strain gauges or manufacturing tolerances in the sensor dimensions do not affect the independence from the point of application of the force on the key.

Finally, the measurement errors usually caused by the interlocking ball of the insert 17 or 17', which can even reach 1% of the measurement, are eliminated with this new solution.

The invention claimed is:

1. A clamping tool with tightening torque control comprising:

a body, containing control circuits and an electronic processing unit, the body having at a first end thereof a handle for the grip of an operator who performs a tightening, and at a second end thereof an arm, said arm comprising at a free end thereof a seat wherein a plurality of inserts can alternatively be inserted, suitable for engaging the tool with a corresponding type and/or size of a mechanical unit on which the tool is intended to act to perform a tightening operation;

sensor means for detecting the tightening torque exerted on said mechanical unit, said sensor means comprise a first torque sensor and a second torque sensor arranged respectively along a longitudinal axis of the arm in a first position of the arm at a first distance from the free end of the arm and in a second position of the arm at a second distance from the free end of the arm, the first and second torque sensors being able to detect the torque exerted by a tightening operation in the first and second positions and to transmit the detection to the processing unit of the tool which calculates the torque exerted at a point of application on the mechanical member, the point of application being placed at a known distance from the free end of the arm, wherein the calculation of the torque exerted at the point of application is performed by calculating a bending moment along a longitudinal axis of a key that increases linearly distributed along a straight line, by two measurements in the first and second positions calculating a slope of the straight line, and from the slope of the straight line and the known distance, the bending moment at the point of application is obtained, which identifies a rotation axis of the mechanical member to be tightened and the tightening torque in the point of application, wherein each of the first and second torque sensors comprises a Wheatstone bridge having four strain gauge grids which form a sensitive element, and wherein each Wheatstone bridge has two strain gauges mounted on a traction side, and two strain gauges on an opposite compression side on cells arranged in the arm, the traction side and the compression side being opposite sides of the cells that extend parallel to the rotation axis of the mechanical member.

2. The clamping tool according to claim 1, wherein the arm is tube shaped, and the cells have a rectangular or square section.

3. The clamping tool according to claim 1, wherein the longitudinal axis of the key is perpendicular to the rotation axis of the mechanical member.

* * * * *